(12) United States Patent
Maher et al.

(10) Patent No.: US 11,051,365 B2
(45) Date of Patent: Jun. 29, 2021

(54) HEATING ROD

(71) Applicant: BorgWarner Ludwigsburg GmbH, Ludwigsburg (DE)

(72) Inventors: Anthony Maher, Foynes (IE); Thomas O'Carroll, Causeway (IE); Kevin Dukes, Co. Kerry (IE); Orla O'Connor, Tralee (IE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 498 days.

(21) Appl. No.: 15/487,014

(22) Filed: Apr. 13, 2017

(65) Prior Publication Data

US 2017/0303341 A1   Oct. 19, 2017

(30) Foreign Application Priority Data

Apr. 15, 2016 (DE) .................. 10 2016 107 035.1

(51) Int. Cl.
| | |
|---|---|
| *H05B 3/14* | (2006.01) |
| *B60H 1/22* | (2006.01) |
| *H05B 3/24* | (2006.01) |
| *H05B 3/46* | (2006.01) |

(52) U.S. Cl.
CPC ........... *H05B 3/141* (2013.01); *B60H 1/2218* (2013.01); *B60H 1/2225* (2013.01); *H05B 3/24* (2013.01); *H05B 3/46* (2013.01); *H05B 2203/02* (2013.01)

(58) Field of Classification Search
CPC . H05B 3/03; H05B 3/06; H05B 3/141; H05B 3/24; H05B 3/26; H05B 3/265; H05B 3/267; H05B 3/46; H05B 2203/02; B60H 1/2218; B60H 1/2225

USPC ........................................................ 219/544
See application file for complete search history.

(56) References Cited

U.S. PATENT DOCUMENTS

| | | | | |
|---|---|---|---|---|
| 5,471,034 | A * | 11/1995 | Kawate ................ | B60H 1/2225 219/483 |
| 2003/0132222 | A1* | 7/2003 | Bohlender ............ | F24H 3/0405 219/504 |
| 2004/0169027 | A1* | 9/2004 | Bohlender ........... | B60H 1/2225 219/202 |
| 2009/0314764 | A1* | 12/2009 | Mori ..................... | F24H 3/0405 219/520 |
| 2014/0034634 | A1 | 2/2014 | Waechter et al. | |
| 2019/0084374 | A1* | 3/2019 | Min ....................... | F24H 3/047 219/490 |

FOREIGN PATENT DOCUMENTS

| | | | | |
|---|---|---|---|---|
| DE | 10 2012 107 113 | A1 | 2/2014 | |
| KR | 101913121 | B1 * | 1/2016 | ........... H05B 1/0236 |

OTHER PUBLICATIONS

Machine translation of KR101913121B1 (Year: 2016).*

* cited by examiner

*Primary Examiner* — Erin E McGrath
(74) *Attorney, Agent, or Firm* — Bose McKinney & Evans LLP

(57) ABSTRACT

A heating rod having a plurality of ceramic heating elements, a first strip-shaped contact sheet, a second strip-shaped contact sheet, and a housing in which the plurality of heating elements and the contact sheets are arranged. The first contact sheet electrically contacts only a part of the plurality of the heating elements, and the second contact sheet electronically contacts a second part of the plurality of the heating elements.

15 Claims, 3 Drawing Sheets

HEATING ROD

RELATED APPLICATIONS

This application claims priority to DE 10 2016 107 035.1, filed Apr. 15, 2016, the entire disclosure of which is hereby incorporated herein by reference in its entirety.

BACKGROUND AND SUMMARY

The present invention relates to a heating rod of the type disclosed in DE 10 2012 107 113 A1. Such heating rods can be used for heating the interior of vehicles, for example.

In vehicles, the heating power of such heating rods can be adjusted by pulse width modulation of the voltage applied to the heating rod. This involves a rather complicated controller.

This disclosure shows how the heating power of a heating rod can be adjusted with less control effort.

In a heating rod according to this disclosure a first contact sheet electrically contacts only a first part of the plurality of the heating elements of the heating rod, whereas a second contact sheet contacts a second part of the plurality of heating rods. Hence, when a voltage is applied only to the first contact sheet, only some of the heating elements are activated, i.e., have a current flow through them, and generate heat. By applying a voltage to both contact sheets, all heating elements can be activated and thereby a larger heating power used.

Thus a heating rod according to this disclosure has three terminals, namely for applying a voltage to the first contact sheet, for applying a voltage to the second contact sheet and for a connection to ground. Prior art heating rods have only two terminals as voltage is either applied to all heating elements or to none.

Preferably, the second contact sheet electrically contacts only the second part of the plurality of heating elements and is electrically isolated from the first part of the plurality of heating elements. Then it is possible to activate either the first part or the second part of the plurality of heating elements or to activate all heating elements.

The first part of the plurality of the heating elements and the second part of the plurality of the heating elements together can be all the heating elements of the heating rod. It is also possible that there is an additional contact sheet contacting another part of the plurality of heating elements.

In a first embodiment of this disclosure, the first contact sheet and the second contact sheet are arranged on top of each other with an insulation layer between them. In this case, the first contact sheet is shorter than the second contact sheet so that the first contact sheet covers and electrically contacts only a first part of the plurality of the heating elements arranged in the housing. The second contact sheet covers the first contact sheet and extends beyond it so that it covers and electrically contacts the second part of the plurality of the heating elements arranged in the housing. The second contact sheet does not electrically contact the first part of the plurality of the heating elements arranged in the housing because of the isolation layer arranged between the first contact sheet and the second contact sheet.

If the second contact sheet is arranged on top of the first contact sheet, the second contact sheet may form a step between a first section of the second contact sheet covering the first contact sheet and a second section of the second contact sheet contacting the second part of the plurality of heating elements.

In a second embodiment of this disclosure, the first contact sheet and the second contact sheet are arranged side by side. For example, the second contact sheet may have a narrow section, which is arranged alongside the shorter first contact sheet, and a broad section contacting the second part of the plurality of heating elements. In this case, an isolation layer can be arranged between the narrow section and the first part of the plurality of heating elements so that the second contact sheet does not electrically contact the first part of the plurality of heating elements.

The heating elements may be PTC heating elements, preferably on the basis of barium titanate.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
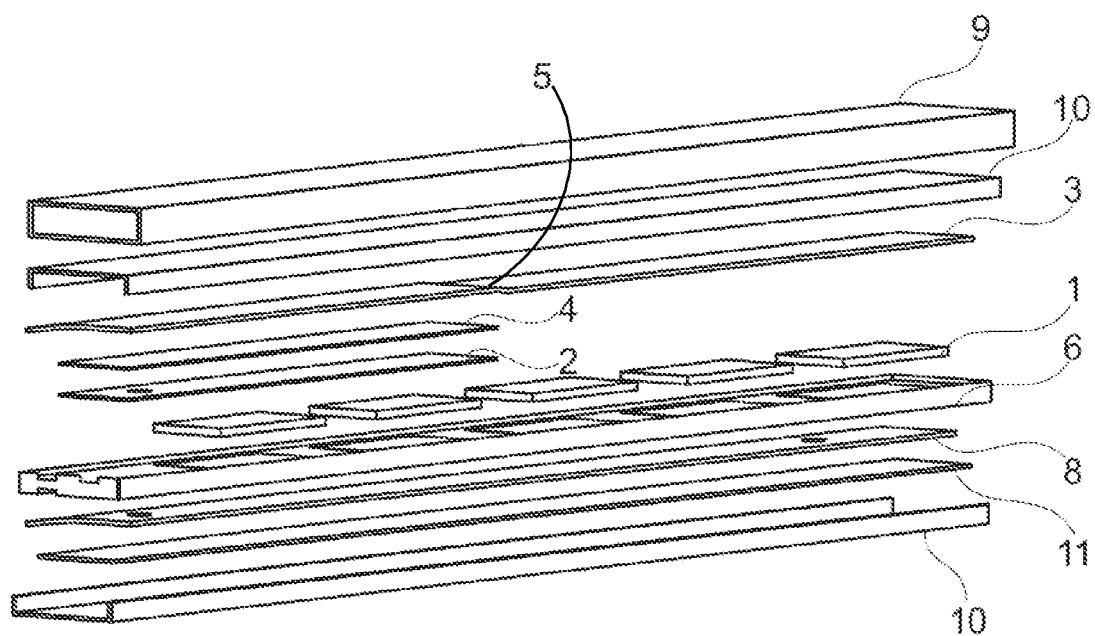
FIG. 1 shows an exploded view of a first illustrative embodiment of a heating rod.

The heating rod shown in FIG. 1 comprises a plurality of resistive heating elements 1, e.g., ceramic PTC heating elements on the basis of barium titanate. A first part of the plurality of heating elements, namely the first two heating elements from the left in FIG. 1, are electrically contacted by a first strip-shaped contact sheet 2. A second part of the plurality of heating elements, namely the third to fifth heating elements 1 from the left in FIG. 1, are contacted by a second strip-shaped contact sheet 3.

The second contact sheet 3 is arranged on top of the first contact sheet 2. The first contact sheet 2 and the second contact sheet 3 are electrically isolated from each other by an isolating layer 4 arranged between them. The second contact sheet 3 has a step 5 between a first section that is arranged above the first contact sheet 2 and a second section contacting the second part of the plurality of heating elements 1.

The heating elements 1 are held in a plastic frame 6. The plastic frame 6 has on a front side two cut outs for a terminal section of the first contact sheet 2 and of the second contact sheet 3.

The ceramic heating elements 1 can be connected to ground via a housing 9, in which the heating elements 1, the contact sheets 2, 3 and the frame 6 are arranged. In the embodiment shown in FIG. 1, the heating elements 1 are connected to ground via a third contact sheet 8. A first side of the ceramic heating elements 1 is in electrical contact with the third contact sheet 8. The opposite side of the heating elements 1 is contacted by the first electrical sheet 2 or the second electrical contact sheet 3, respectively. The plastic frame 6 has another cut out for a terminal section of the third contact sheet 8.

The contact sheets 2, 3, 8 are electrically isolated from the housing 9, which may by a profile tube, e.g., of aluminum. The contact sheets 2, 3, 8 are electrically isolated from the housing 9 by means of isolating layers, e.g., polymer strips 10 and/or ceramic strips 11.

Figure 2:
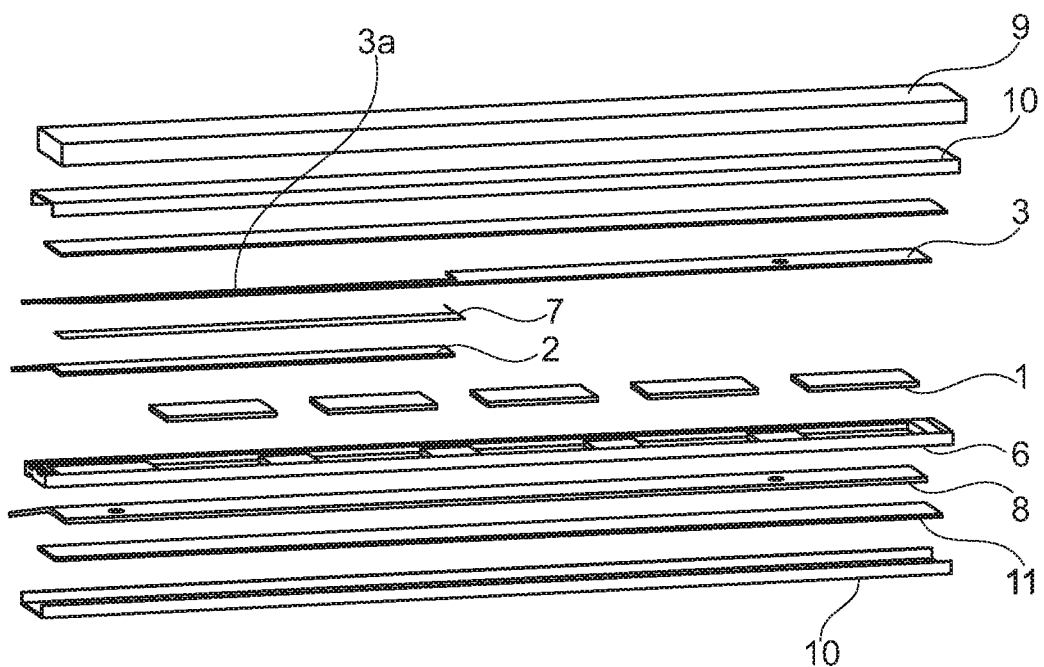
FIG. 2 shows an exploded view of a second illustrative embodiment of a heating rod.

FIG. 2 shows an exploded view of a second illustrative embodiment of a heating rod. The second illustrative embodiment differs from the first illustrative embodiment mainly in the first contact sheet 2 and the second contact sheet 3. In contrast to the embodiment of FIG. 1, the second contact sheet 3 is not arranged on top of the first contact sheet 2. Instead, the second contact sheet 3 has a narrow section 3*a* which is arranged alongside the first contact sheet 2. Like in the embodiment of FIG. 1, the first contact sheet 2 is shorter than the second contact sheet 3 so that only the second contact sheet 3 can reach the second part of the plurality of heating elements 1.

An isolation layer 7 can be arranged between the narrow section 3*a* of the second contact sheet 3 and the heating elements 1, which are electrically contacted by the first contact sheet 2 only. Thus the narrow section 3*a* of the second contact sheet 3 is electrically isolated from the first part of the plurality of heating elements 1. In FIG. 2, the first part of the plurality of heating elements are the first two heating elements 1 from the left.

Figure 3:
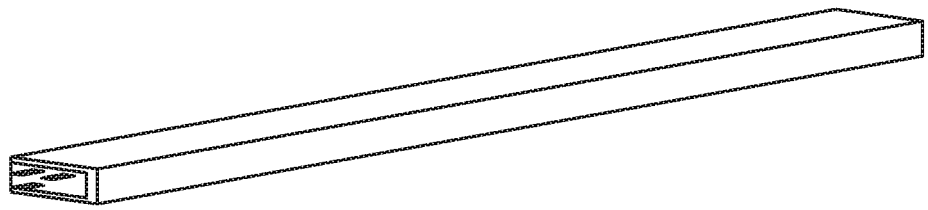
FIG. 3 shows the heating rod of FIG. 2 in a perspective view.

FIG. 3 shows the heating rod of FIG. 2 is a perspective view. As explained above, this heating rod has three terminals corresponding to the three contact sheets 2, 3, 8.

Figure 4:
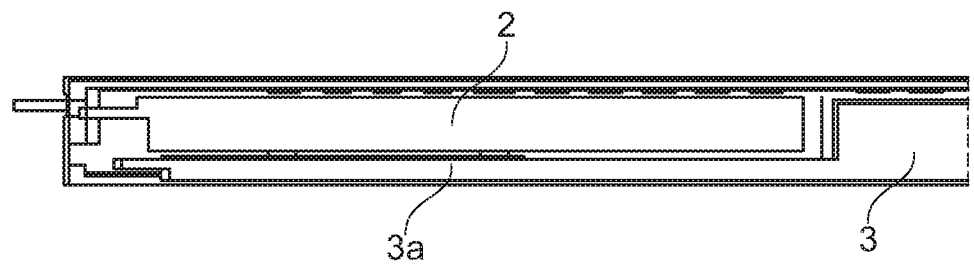
FIG. 4 shows a third illustrative embodiment shown without the housing.

FIG. 4 shows schematically another illustrative embodiment of a heating rod. The heating rod is shown in FIG. 3 without the housing tube. This embodiment is similar to the embodiment of FIG. 2 and differs from it mainly in that the terminal end of the contact sheets 2, 3, 8 are not flush with each other, but at different positions with respect to the longitudinal direction of the housing.

Figure 5:
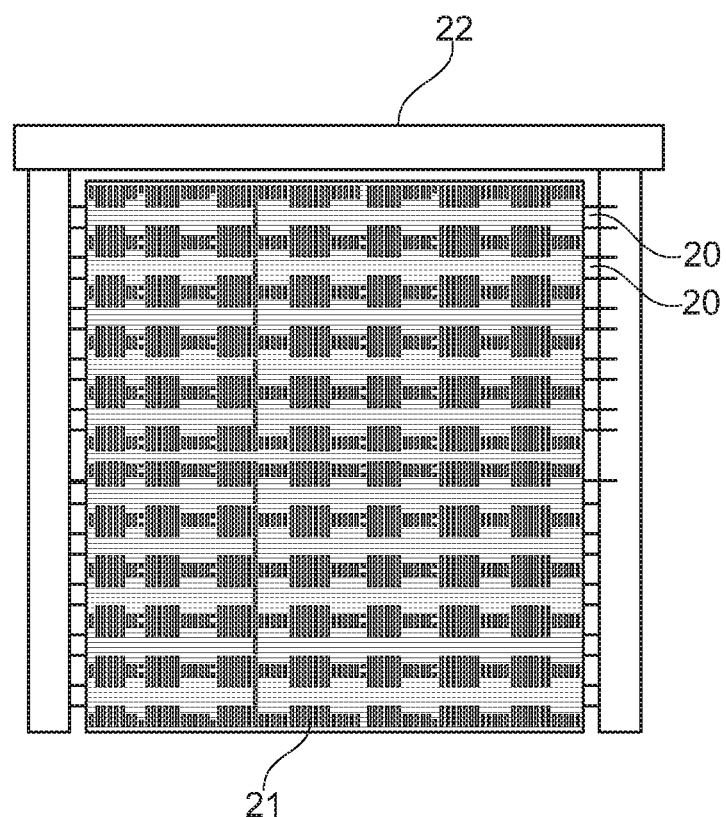
FIG. 5 shows schematically a heating device comprising several heating rods.

FIG. 5 shows schematically a heating device comprising several heating rods 20. The heating rods 20 are connected to fins 21, e.g., made of corrugated metal sheets. The fins 21 and the heating rods 20 are held in a frame 22. Such a heating device can be used to heat air in vehicles.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE SIGNS

1 heating element
2 contact sheet
3 contact sheet
3*a* narrow section of sheet 3
4 isolating layer
5 step
6 frame
7 isolation layer
8 contact sheet
9 housing
10 isolation
11 isolation
20 heating rod
21 fins
22 frame

What is claimed is:

1. A heating rod, comprising:
a plurality of ceramic heating elements;
a first strip-shaped contact sheet;
a second strip-shaped contact sheet; and
a housing in which the plurality of heating elements and the first and second contact sheets are arranged;
wherein:
the first contact sheet electrically contacts only a first part of the plurality of the heating elements and the second contact sheet electrically contacts a second part of the plurality of the heating elements;
the second contact sheet has a narrow section arranged alongside the first contact sheet and a broad section contacting the second part of the plurality of heating elements, the narrow section overlying a top surface of the first part of the plurality of heating elements; and
an isolation layer is sandwiched between the narrow section of the second contact sheet and the first part of the plurality of heating elements.

2. The heating rod according to claim 1, wherein the second contact sheet electrically contacts only the second part of the plurality of the heating elements.

3. The heating rod according to claim 1, wherein the ceramic heating elements are held in a frame which has in a narrow side a first cutout for a terminal section of the first contact sheet and a second cutout for a terminal section of the second contact sheet.

4. The heating rod according to claim 3, further comprising a third contact sheet contacting all heating elements of the plurality of heating elements, wherein the frame has in the narrow side a third cutout for a terminal section of the third contact sheet.

5. The heating rod according to claim 1, wherein the second part of the plurality of the heating elements includes some or all of the heating elements not included in the first part of the plurality of heating elements.

6. The heating rod according to claim 1, wherein the isolation layer is arranged on top of the first part of the plurality of heating elements and the narrow section is arranged on top of the isolation layer.

7. The heating rod according to claim 1, wherein the heating rod has a length, a width and a thickness, the length being larger than the width, and a longitudinal axis extends along the length, wherein the heating elements are aligned along the longitudinal axis.

8. A heating rod, comprising:
a first set of ceramic heating elements and a second set of ceramic heating elements, wherein all heating elements are arranged in a row;
first and second strip-shaped contact sheets; and
a housing in which the first and second sets of heating elements and the first and second contact sheets are arranged;
wherein:
the first contact sheet electrically contacts only the first set of heating elements and does not electrically contact the second set of heating elements, and the second contact sheet electrically contacts the second set of heating elements;

the second contact sheet has a first section contacting the second set of heating elements and a second section overlying the top surface of the first set of heating elements; and an isolation layer is arranged between the second section of the second contact sheet and the first set of heating elements.

9. The heating rod of claim 8, wherein the first and second sets of heating elements share no common heating elements.

10. The heating rod of claim 8, wherein the first contact sheet is shorter than the second contact sheet and the second contact sheet is arranged above the first contact sheet.

11. The heating rod according to claim 10, wherein the second contact sheet has a step arranged between a first section of the second contact sheet and a second section of the second contact sheet, the first section covering the first contact sheet and the second section contacting the second set of heating elements.

12. The heating rod of claim 8, further comprising a third contact sheet that electrically contacts all heating elements in the first and second sets of heating elements.

13. The heating rod according to claim 8, wherein the isolation layer is sandwiched between the second section of the second contact sheet and the first set of heating elements.

14. The heating rod according to claim 8, wherein the second section of the second contact sheet comprises a narrow section arranged alongside the first contact sheet.

15. The heating rod of claim 8, wherein the heating rod has a length, a width and a thickness, the length being larger than the width, and a longitudinal axis extends along the length, wherein the heating elements are aligned along the longitudinal axis.

* * * * *